Figure 1:
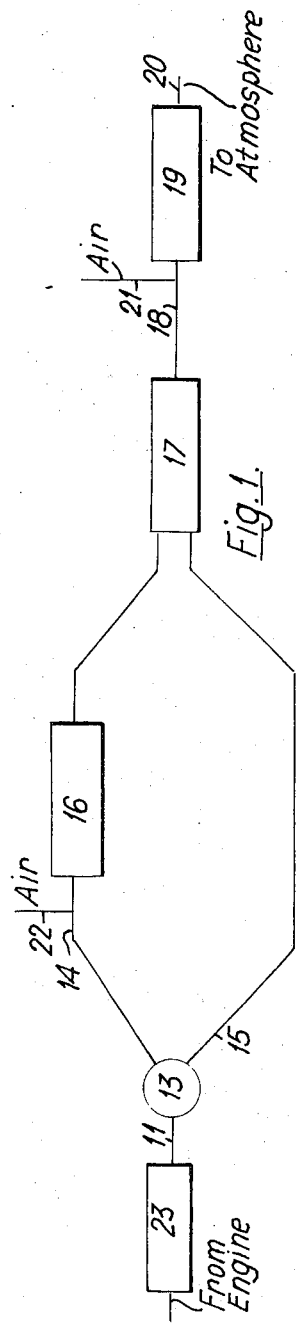
Figure 2:
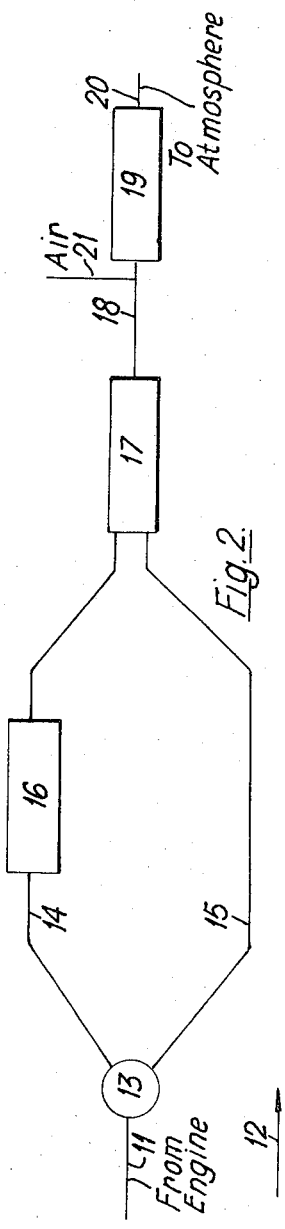

United States Patent [19]
Weaving et al.

[11] 3,810,361
[45] May 14, 1974

[54] EXHAUST SYSTEMS FOR INTERNAL COMBUSTION ENGINES

[75] Inventors: John Harold Weaving, Solihull; Cecil David Haynes, Nuneaton, both of England

[73] Assignee: British Leyland Motor Corporation Limited, London, England

[22] Filed: Dec. 29, 1971

[21] Appl. No.: 213,680

[30] Foreign Application Priority Data
Jan. 19, 1971 Great Britain................ 2460/71

[52] U.S. Cl.............. 60/288, 23/288 F, 60/299, 60/301, 423/213
[51] Int. Cl............................................. F01n 3/16
[58] Field of Search............ 60/287, 288, 299, 301, 60/302, 274; 23/288 F; 423/213, 214

[56] References Cited
UNITED STATES PATENTS

| | | | |
|---|---|---|---|
| 2,664,340 | 12/1953 | Houdry | 60/274 |
| 3,086,839 | 4/1963 | Bloch | 60/288 |
| 3,180,712 | 4/1965 | Hamblin | 60/288 |
| 3,201,206 | 8/1965 | Wawrziniok | 60/299 |
| 3,228,746 | 1/1966 | Howk | 60/301 |
| 3,273,971 | 9/1966 | Baddorf | 60/288 |
| 3,282,046 | 11/1966 | Walker | 60/288 |
| 3,397,034 | 8/1968 | Tulleners | 60/301 |
| 3,440,817 | 4/1969 | Saufferer | 60/288 |

Primary Examiner—Douglas Hart
Attorney, Agent, or Firm—Thomas J. Greer, Jr.

[57] ABSTRACT

An exhaust system includes at least two paths in parallel for exhaust gases. Flow proportioning means govern the relative amounts of gas flowing along each path. A first catalytic reactor is disposed in one of the paths and a second reactor receives the output of the path having the first reactor and of at least one other path.

2 Claims, 2 Drawing Figures

EXHAUST SYSTEMS FOR INTERNAL COMBUSTION ENGINES

This invention relates to exhaust systems for internal combustion engines.

The exhaust gases of internal combustion engines contain varying amounts of carbon monoxide, unburnt hydrocarbons, nitric oxide and particulate matter which contribute to air pollution and particularly to the generation of smog in areas of strong sunlight which has a photochemical effect. Many methods have been evolved, and great efforts have been made, to reduce or eliminate noxious constituents of the exhaust gas. One known device is of the type which is usually known as a catalytic reactor and which provides for the conduction of exhaust gases over a suitable chemical catalyst so that the noxious products are oxidised or reduced to harmless products to a greater or lesser extent.

When exhaust gases of petrol engines are passed over suitable catalysts under controlled conditions a number of reactions occur. One controlling factor is that the exhaust gases should be derived from combustion with fuel ratio greater than stoichiometric — that is to say in excess of the amount necessary for theoretically complete combustion. Under such conditions carbon monoxide is present in the exhaust gases and the reactions represented by the following molecular formulae can be envisaged as taking place:

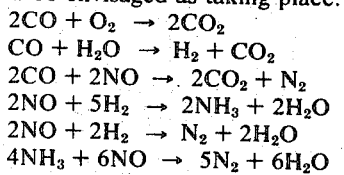

$2CO + O_2 \rightarrow 2CO_2$
$CO + H_2O \rightarrow H_2 + CO_2$
$2CO + 2NO \rightarrow 2CO_2 + N_2$
$2NO + 5H_2 \rightarrow 2NH_3 + 2H_2O$
$2NO + 2H_2 \rightarrow N_2 + 2H_2O$
$4NH_3 + 6NO \rightarrow 5N_2 + 6H_2O$ It is an object of the invention to achieve a balance of these reactions such that objectionable pollutants, such as nitric oxide and carbon monoxide, are minimised.

According to the present invention an exhaust system for an internal combustion engine includes duct means defining at least two paths in parallel for exhaust gases from the engine, flow proportioning means whereby the proportion of exhaust gas flowing along each of the paths relative to the total exhaust gas flowing along both, or all, the paths can be governed, a first catalytic reactor disposed in one of the paths, combining means downstream of the first catalytic reactor combining the exhaust gas output of said reactor and the exhaust gas output of at least one other path, and a second catalytic reactor adapted to receive as input the exhaust gas output of the combining means.

In a first preferred form of the invention the flow proportioning means is disposed upstream of the duct means and is adapted to receive as input the total exhaust gas flow for the system and to provide as output separate exhaust gas flows to, or at least two of, the paths in parallel.

In a second preferred form of the invention inlet means are provided whereby a supply of oxygen or oxygen bearing fluid can be added to gases flowing along the path including, and prior to entry of the gases to, the first catalytic reactor.

In a third preferred form of the invention a further catalytic reactor is provided upstream of the duct means so that the further catalytic reactor receives as input the total exhaust gas flow for the system.

In a fourth preferred form of the system the exhaust gas output of the second catalytic reactor is fed as input to a third catalytic reactor. In a preferred version of this fourth form inlet means are provided whereby a supply of oxygen or oxygen bearing fluid can be added to gases flowing from the second to the third catalytic reactor.

In a fifth preferred form of the system the flow proportioning means is adjustable so that the relative proportioning of exhaust gas flow along each of the paths can be varied.

Two embodiments of the invention will now be described, by way solely of example, with reference to the accompanying drawing of which each figure is a block diagram of an exhaust system for a petrol driven road vehicle.

Both figures show an exhaust pipe 11 along which exhaust gases pass in the direction of arrow 12 from a petrol engine. Valve 13 is a flow proportioning means whereby the exhaust gas in pipe 11 is split to flow into ducts 14, 15 in proportions which can be varied as required. Duct 14 contains a first catalytic reactor 16. Both ducts 14, 15 feed a second catalytic reactor 17 through which the gases from the ducts pass to enter pipe 18 which feeds a third reactor 19. The output from reactor 19 passes to atmosphere by way of tail pipe 20.

An air inlet 21 is provided by means of which air or an oxygen bearing fluid is injected into the exhaust gases passing along duct 18 to oxidise products such as unburnt hydrocarbons and carbon monoxide to carbon dioxide and water.

The exhaust system shown in FIG. 1 has an additional air inlet 22 by means of which air is fed into exhaust gases passing along duct 14 for the same purpose as that mentioned above with respect to air inlet 21. In addition a further catalytic reactor 23 is disposed upstream of valve 13 to receive the entire exhaust gas output of the engine before it is proportionately distributed by valve 13.

The valve 13 is adjustable to meet the varying conditions of speed and load to which the engine is subject. However to simplify the system the valve can be replaced by a Y-junction and non-variable flow proportioning means such as orifice plates disposed in ducts 14, 15 to provide for a fixed proportioning of the total exhaust gas flow between each duct.

First reactor 16 serve to catalyse the conversion of nitric oxide to ammonia. Second reactor 17 catalyses reaction between nitric oxide (from gases from duct 15) and ammonia (from gases from duct 14).

Third reactor 19 as previously mentioned catalyses oxidation of any unburnt hydrocarbons and carbon monoxide before passage of exhaust to atmosphere.

Further reactor 23 provides a general oxidation effect to the entire exhaust gas output of the engine similar to that of the third reactor 19.

To reduce the complication of a system with more than one catalytic reactor the separately shown reactors 16, 17, 19 (and where required 23) can be physically combined into a single reactor box with several compartments suitably connected and controlled.

Whether physically separate or combined the reactors can be lagged or cooled to ensure the optimum working temperature for the catalyst contained in the reactor and the reaction catalysed.

I claim:

1. An exhaust system for an internal combustion engine including, duct means defining at least two paths in parallel for exhaust gases from the engine, flow proportioning means whereby the proportion of exhaust gas flowing along each of the paths relative to the total exhaust gas flowing along both, or all, the paths can be governed, inlet means adapted to link the flow proportioning means to the engine, outlet means adapted to link the proportioning device with each of said paths, a first catalytic reactor disposed in one of the paths, combining means downstream of the first catalytic reactor combining the exhaust gas output of said first reactor and the exhaust gas output of at least one other path, a second catalytic reactor coupled to and receiving as its input the exhaust gas output of the combining means, a third catalytic reactor coupled to and receiving as its input the output of the second catalytic reactor; the first and second catalytic reactors containing a material which catalyzes the reduction of nitric oxides and the third catalytic reactor containing a material which catalyzes the oxidation of unburnt hydrocarbons and carbon monoxide, a fourth catalytic reactor, said fourth reactor provided upstream of and coupled to the duct means, whereby the fourth catalytic reactor receives as input the total exhaust gas flow for the system.

2. An exhaust system for an internal combustion engine including, duct means defining at least two paths in parallel for exhaust gases from the engine, flow proportioning means whereby the proportion of exhaust gas flowing along each of the paths relative to the total exhaust gas flowing along both, or all, the paths can be governed, inlet means adapted to link the flow proportioning means to the engine, outlet means adapted to link the proportioning device with each of said paths, a first catalytic reactor disposed in one of the paths, combining means downstream of the first catalytic reactor combining the exhaust gas output of said first reactor and the gas output of at least one other path, a second catalytic reactor coupled to and receiving as its input the exhaust gas output of the combining means, a third catalytic reactor coupled to and receiving as its input the output of the second catalytic reactor; the first and second catalytic reactors containing a material which catalyzes the reduction of nitric oxides and the third catalytic reactor containing a material which catalyzes the oxidation of unburnt hydrocarbons and carbon monoxide, air inlet means in the path between said second and third catalytic reactors, whereby a supply of oxygen or oxygen bearing fluid can be added to gases flowing from the second or third catalytic reactors.

* * * * *